United States Patent
Seshadri et al.

(10) Patent No.: US 8,116,823 B2
(45) Date of Patent: *Feb. 14, 2012

(54) MODULAR EAR-PIECE/MICROPHONE (HEADSET) OPERABLE TO SERVICE VOICE ACTIVATED COMMANDS

(75) Inventors: Nambirajan Seshadri, Irvine, CA (US); James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/343,846

(22) Filed: Dec. 24, 2008

(65) Prior Publication Data
US 2009/0104940 A1 Apr. 23, 2009

Related U.S. Application Data

(63) Continuation of application No. 11/932,362, filed on Oct. 31, 2007, now abandoned, which is a continuation of application No. 11/120,900, filed on May 3, 2005, now Pat. No. 7,343,177.

(51) Int. Cl.
*H04M 1/00* (2006.01)
(52) U.S. Cl. ...................................................... 455/563
(58) Field of Classification Search ............... 455/41.1, 455/41.2, 563, 566, 569, 570, 575.1, 575.2; 379/426.01, 433.01
See application file for complete search history.

(56) References Cited

U.S. PATENT DOCUMENTS

| | | |
|---|---|---|
| 6,424,820 B1 | 7/2002 | Burdick et al. |
| 6,714,233 B2 * | 3/2004 | Chihara et al. ............... 455/566 |
| 7,110,801 B2 * | 9/2006 | Nassimi ...................... 455/575.2 |
| 2002/0196955 A1 | 12/2002 | Boesen et al. |
| 2004/0001588 A1 * | 1/2004 | Hairston ....................... 379/419 |

FOREIGN PATENT DOCUMENTS

| | | |
|---|---|---|
| DE | 19645259 A1 | 5/1998 |
| DE | 10114109 A1 | 9/2002 |
| EP | 1213896 A1 | 6/2002 |

OTHER PUBLICATIONS

European Search Report dated Jun. 17, 2010; EP Application No. 04012807.6-1246.

* cited by examiner

*Primary Examiner* — Thanh Le
(74) *Attorney, Agent, or Firm* — Garlick Harrison & Markison; Kevin L. Smith

(57) ABSTRACT

The present invention provides a modular headset operable to support both voice communications and voice activated commands. This may involve the use of multiple voice CODECs to process voice communications and voice activated commands. The modular headset includes both a microphone and wireless earpiece. The earpiece may further include an interface, a processing circuit, a speaker, a user interface, a pairing circuit, and a registration circuit. The interface allows the earpiece to communicate with the base unit that couples the modular headset to a servicing network. This coupling to the servicing network and base unit only occurs when the headset is successfully registered to the base unit. The pairing circuit and registration circuit allow the exchange of pairing or registration information between various components. The pairing circuit allows the wireless earpiece and microphone to exchange pairing information which is then compared to determine whether or not a successful pairing can be achieved. Analog to digital converts (ADCs), which may be located within either the microphone or earpiece are operable to process the transduced voice communications in accordance with either a voice CODEC or voice recognition CODEC depending on the selected mode of operation.

12 Claims, 13 Drawing Sheets

MODULAR EAR-PIECE/MICROPHONE (HEADSET) OPERABLE TO SERVICE VOICE ACTIVATED COMMANDS

CROSS REFERENCES TO RELATED APPLICATIONS

The present U.S. Utility Patent Application is a continuation of, and claims priority pursuant to 35 U.S.C. §120 to U.S. Utility application Ser. No. 11/932,362, entitled "MODULAR EAR-PIECE/MICROPHONE (HEADSET) OPERABLE TO SERVICE VOICE ACTIVATED COMMANDS,", filed Oct. 31, 2007, now abandoned, which is a continuation of U.S. Utility application Ser. No. 11/120,900, entitled "MODULAR EAR-PIECE/MICROPHONE (HEADSET) OPERABLE TO SERVICE VOICE ACTIVATED COMMANDS,", filed May 3, 2005, now issued as U.S. Pat. No. 7,343,177, both of which are incorporated herein by reference in their entirety.

This Application is related to the following applications:
1. Application Ser. No. 10/981,418 entitled "UNIVERSAL WIRELESS MULTIMEDIA DEVICE," filed on Nov. 4, 2004;
2. Application Ser. No. 10/976,300 entitled "MODULAR WIRELESS MULTIMEDIA DEVICE," filed on Oct. 27, 2004;
3. Application Ser. No. 10/856,124 entitled "MODULAR WIRELESS HEADSET AND/OR HEADPHONES," filed May 28, 2004;
4. Application Ser. No. 10/856,430 entitled "PROVIDING A UNIVERSAL WIRELESS HEADSET," filed May 28, 2004;
5. Application Ser. No. 11/120,765 entitled "MODULAR EARPIECE/MICROPHONE THAT ANCHORS VOICE COMMUNICATIONS," filed on May 3, 2005;
6. Application Ser. No. 11/122,146 entitled "HANDOVER OF CALL SERVICED BY MODULAR EARPIECE/MICROPHONE BETWEEN SERVICING BASE PORTIONS," filed on May 4, 2005;
7. Application Ser. No. 11/120,903 entitled "BATTERY MANAGEMENT IN A MODULAR EARPIECE MICROPHONE COMBINATION," filed on May 3, 2005;
8. Application Ser. No. 11/120,904 entitled "PAIRING MODULAR WIRELESS EARPIECE/MICROPHONE (HEADSET) TO A SERVICED BASE PORTION AND SUBSEQUENT ACCESS THERETO," filed on May 3, 2005;
9. Application Ser. No. 11/120,902 entitled "MANAGING ACCESS OF MODULAR WIRELESS EARPIECE/MICROPHONE (HEADSET) TO PUBLIC/PRIVATE SERVICING BASE STATION," filed on May 3, 2005;
10. Application Ser. No. 11/120,676 entitled "EARPIECE/MICROPHONE (HEADSET) SERVICING MULTIPLE INCOMING AUDIO STREAMS," filed on May 3, 2005; and
11. Application Ser. No. 11/120,455 entitled "INTEGRATED AND DETACHABLE WIRELESS HEADSET ELEMENT FOR CELLULAR/MOBILE/PORTABLE PHONES AND AUDIO PLAYBACK DEVICES," filed on May 3, 2005, all of which are incorporated herein by reference in their entirety for all purposes.

BACKGROUND OF THE INVENTION

1. Field of the Invention

This invention generally relates to wireless communications and more particularly to the servicing of voice activated commands within a modular headset operable to support voice communications.

2. Background of the Invention

Wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such devices enable these wireless communications. Such wireless communications have been extended to personal wireless networks, such as these defined by the Bluetooth specification. Not only have cellular telephones become very popular, but Wireless Local Area Networking (WLAN) devices have also proliferated. One standard for wireless networking, which has been widely accepted, is the Specification of the Bluetooth System, v. 1.0 ("Bluetooth Specification").

The Bluetooth Specification enables the creation of small personal area networks (PAN's) where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices supports voice communication, the voice communications must be wirelessly supported in a continuous fashion so that carried voice signals are of an acceptable quality. One popular use of personal wireless networks couples a wireless headset(s) with cellular telephone(s), personal computer(s), and laptop(s), etc. The Bluetooth Specification provides specific guidelines for providing such wireless headset functionality. Additionally, pairing and registration protocols are desirable to maintain privacy and security.

Bluetooth provides a headset profile that defines protocols and procedures for implementing a wireless headset to a device private network. Once configured, the headset functions as the device's audio input and output. As further defined by the Bluetooth Specification, the headset must be able to send AT (Attention) commands and receive resulting codes, such that the headset can initiate and terminate calls. The Bluetooth Specification also defines certain headset profile restrictions. These restrictions include an assumption that the ultimate headset is assumed to be the only use case active between the two devices. The transmission of audio is based on continuously variable slope delta (CVSD) modulation. The result is monophonic audio of a quality without perceived audio degradation. Only one audio connection at a time is supported between the headset and audio gateway. The audio gateway controls the synchronous connection orientated (SCO) link establishment and release. The headset directly connects and disconnects the internal audio stream upon SCO link establishment and release. Once the link is established, valid speech exists on the SCO link in both directions. The headset profile offers only basic inoperability such that the handling of multiple calls or enhanced call functions at the audio gateway is not supported. Another limitation relates to the manner which Bluetooth devices service only single channel audio communications. In most cases, the Bluetooth device is simply a replacement for a wired headset. Such a use of the Bluetooth device, while providing benefits in mobility of the user, provides little additional benefit over wired devices. In fact, privacy and security associated with these devices can be less than that offered by wired devices. Because wired solutions provide many current Bluetooth devices, that service voice communications, the use of such devices may be questioned.

Thus, there is a need for improved security and privacy operations by WLAN devices servicing audio or multimedia communications that provide additional user functionality and improved service quality.

BRIEF SUMMARY OF THE INVENTION

Embodiments of the present invention are directed to systems and methods that are further described in the following description and claims. Other features and advantages and features of embodiments of the present invention may become apparent from the description, accompanying drawings and claims.

DETAILED DESCRIPTION OF THE INVENTION

Figure 1:
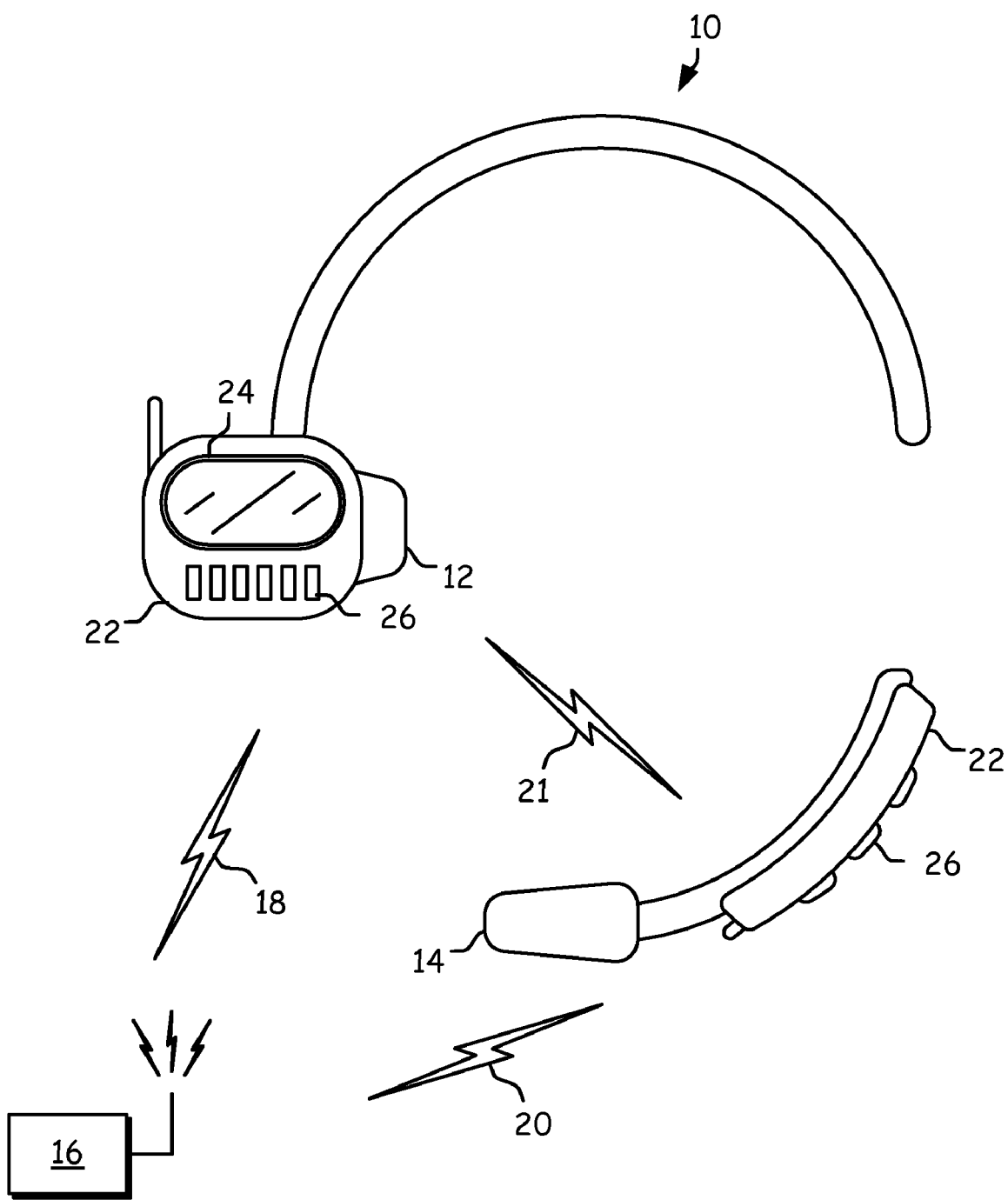
FIG. 1 is a diagram of a wireless headset in accordance with one embodiment of the present invention.

FIG. 1 is a diagram of a modular wireless headset 10 wirelessly coupled to base unit 16 that includes wireless earpiece 12 and wireless microphone 14. Wireless earpiece 12 communicates wirelessly with microphone 14. However, wireless earpiece 12 and wireless microphone 14 may also physically couple to exchange information establishing trusted pair relationships or establish an alternate communication pathway. Accordingly, earpiece 12 and microphone 14 may be separate communication devices. A shaped battery may be used as the framework of the headset and removably couple to earpiece 12. Those devices may individually communicate with base unit 16 via separate communication pathways or through a single wireless interface contained either in the earpiece or microphone. As shown, earpiece 12 and microphone 14 may both communicate with base unit 16, which may be a cellular telephone, wire line telephone, laptop computer, personal computer, personal digital assistant, etc., using transceiver (transmitter and/or receiver) 13 of FIG. 2 via a first communication pathway 18. Base unit 16 may also directly couple the headset to voice communication networks such as radio, cellular, wireless voice or packet data, public switched telephone networks (PSTN), private branch exchanges, or others known to those skilled in the art.

Although shown as being external to earpiece 12, transceivers 13 and 15 may be integrated within earpiece 12 and microphone 14. Base unit 16 is operable to establish a wireless pathway to earpiece 12 and/or microphone 14. This pathway may be direct or via another wireless component and pathway, such as pathway 21. For example, wireless microphone 14 may communicate via base unit 16 through a wireless pathway between earpiece 12 and base unit 16. Similarly, wireless earpiece 12 could communicate with base unit 16 through wireless microphone 14. Microphone 14 may communicate with the base unit 16 or earpiece 12 using transceiver (or transmitter) 15 of FIG. 2 via communication pathway 20 or 21, respectively. Either or both earpiece 12 and microphone 14 may have a user interface 22. If the communication pathways are established in accordance with the Bluetooth specification, communication resources 18, 20, and 21 may be different timeslot allocations on the same synchronous connection orientated (SCO) link, or may be separate SCO links.

Earpiece 12 and microphone 14 both contain a pairing circuit. These pairing circuits are operable to pair the wireless earpiece and microphone when pairing information associated with the individual earpiece 12 and microphone 14 compare favorably. If the pairing information associated with the individual earpiece 12 and microphone 14 compares unfavorably, these individual components may not pair to form a modular wireless headset. Pairing allows the microphone and earpiece, after the wireless earpiece and microphone are successfully paired, to establish a wireless connection between them. Also in the event that one of the modular components needs to be added or replaced to the modular wireless headset 10, this component would have to pair to the other components present.

Pairing quite simply is the act of introducing two wireless devices to one another so that they can then communicate. Pairing enables the two or more wireless devices to join and become a trusted pair. Within a trusted pair, each device recognizes the other device(s). Then, each device can automatically accept communication and bypass the discovery and authentication process that normally happen during an initial wireless interaction between devices. Once the trusted pair is established, some embodiments may require user authentication before other devices are allowed to enter into the trusted pair. This prevents, for example, a second wireless earpiece, not of the trusted pair, from establishing communications with wireless headset 10. This could result in an untrusted earpiece eavesdropping on the voice communication serviced by modular wireless headset 10. Thus, pairing enables security and privacy for voice communications serviced by modular wireless headset 10. Additionally, some embodiments may only pair when a discoverability function associated with the wireless device is enabled. For example, the device may pair when physically coupled or when a user toggles a pairing switch located on user interface 22. When the discoverability/pairing function is not enabled, the wireless devices will not accept communications from unknown devices.

Standards such as the 802.11 standard may specify a common medium access control (MAC) Layer, operable to provide a variety of functions that support the operation wireless local area networks (LANs). In general, the MAC Layer manages and maintains communications between wireless components (i.e. radio network cards and access points) by coordinating access to a shared radio channel and utilizing protocols that enhance communications over a wireless medium. Often viewed as the "brains" of the network, the MAC Layer may use a Physical (PHY) Layer, such as 802.11n, 802.11g, 802.11b, or 802.11a, to perform the tasks of carrier sensing, transmission, and receiving of frames. The pairing and registration circuits may implement MAC layer security with software code executed within the various wireless components. For example, the authentication process of proving identity specified by the 802.11 standard includes two forms: Open system authentication and shared key authentication. Open system authentication is mandatory, and it's a two step process. A network interface card (NIC) first initiates the process by sending an authentication request frame to the access point or base station. The access point or base station replies with an authentication response frame containing approval or disapproval of authentication. Shared key authentication is an optional four step process that bases authentication on whether the authenticating device has the correct WEP (wired equivalent privacy) key. The wireless NIC starts by sending an authentication request frame to the access point. The access point or base station then places challenge text into the frame body of a response frame and sends it to the radio NIC. The radio NIC uses its WEP key to encrypt the challenge text and then sends it back to the access point or base station in another authentication frame. The access point or base station decrypts the challenge text and compares it to the initial text. If the text is equivalent, then the access point assumes that the radio NIC has the correct key. The access point finishes the sequence by sending an authentication frame to the radio NIC with the approval or disapproval.

Once authenticated, the radio NIC must associate with the access point or base station before sending data frames. Association is necessary to synchronize the radio NIC and access point or base station with important information, such as supported data rates. The radio NIC initiates the association by sending an association request frame containing elements such as SSID and supported data rates. The access point responds by sending an association response frame containing an association ID along with other information regarding the access point. Once the radio NIC and access point complete the association process, they can send data frames to each other.

User interface 22 may also allow a user to initiate call functions or network hardware operations. These call functions include call initiation operations, call conferencing operations, call forwarding operations, call hold operations, call muting operations, and call waiting operations. Additionally, user interface 22 allows the user to access network interface functions, hardware functions, base unit interface functions, directory functions, caller ID functions, voice activated commands, playback commands and device programming functions. User interface 22 can be any combinations of a visual interface as evidenced by display 24, tactile interface as evidenced by buttons 26, and/or an audio interface.

Each of these devices, earpiece 12, microphone 14 and base unit 16, may support one or more versions of the Bluetooth Specification or other wireless protocols. A Bluetooth "scatternet" is formed from multiple "piconets" with overlapping coverage. A user of modular wireless headset 10 may establish communications with any available base unit 16. Wireless headset 10 may have a minimal user interface 22 where a single authenticate or register button initiates registration. Modular wireless headset 10 includes a registration circuit. This registration circuit needs to reside in either or both the wireless microphone and wireless earpiece. The registration circuit receives and exchanges registration information with base unit 16. Once this information is exchanged, the modular wireless headset, as well as base unit 16, compares their registration information with the exchanged information to determine whether or not modular wireless headset 10 is authorized to use base unit 16. Authorization will occur when the registration information within the modular wireless headset compares favorably to that of the base unit. This may involve accessing a third-party database in order to confirm where the base unit establishes communications between a servicing network, such as a cellular or public switch telephone network (PSTN) network, or a local authentication via a local database that may compare biometric, password user interface, VRS voice pattern recognition, encryption key/ Donegal, in order to allow modular wireless headset 10 to access resources available through base unit 16.

Registration may determine what resources the headset may access. For example, access may be granted to an available one cellular network but not a wireless packet data network. Registration may require physically coupling modular wireless headset 10 to base unit 16 or establishing wireless communications. In the case where wireless communications are established, this may require additional user input or proximity testing to authenticate and register the modular wireless headset to the base unit. The base unit, as well as the modular wireless headset, may access memory either local or via server or network to validate the registration information associated with the other component. Thus, both the base unit needs to compare the registration information and result in a favorable comparison, as well as the modular wireless headset comparing the registration information in order to result in a favorable comparison. For example, where fees are required for access, the user may not authenticate registration to avoid the fee. Registration allows communications to be automatically exchanged between the modular wireless headset and the base unit. This improves both security and privacy for communications serviced using the modular wireless headset.

Wireless headset 10 may reside within the service coverage area of multiple base units. Thus, when headset 10 enters (or powers up in) an area with more than one functioning wireless network, a user may depress authenticate button 26, use a voice command or other means to start the authentication/ registration process. With the button depressed, the wireless headset attempts to establish communications with base unit 16. Subsequent authentication operations are required to have the wireless headset join the selected network. These subsequent operations may include prompting the user for selection of the network, requiring that an entry be previously made in an access list to allow wireless headset 10 to join or otherwise complete the authentication operations (registration).

Once wireless headset 10 joins a respective network, headset 10 may service voice communications with the base unit via respective WLAN links. Such calls will be received and managed by base unit 16 or headset 10. Management duties for the calls may be divided between base unit 16 and headset 10. For example, upper level portions of the cellular protocol stack may be supported by the headset while the lower level portions are supported by the base unit. Integrated circuits in either headset 10 or base unit 16 support call functions. These call functions include, but are not limited to, call initiation and termination, call conferencing operations, call forwarding operations, call hold operations, call muting operations, or call waiting operations, and may be initiated through user interface 22.

Figure 2:
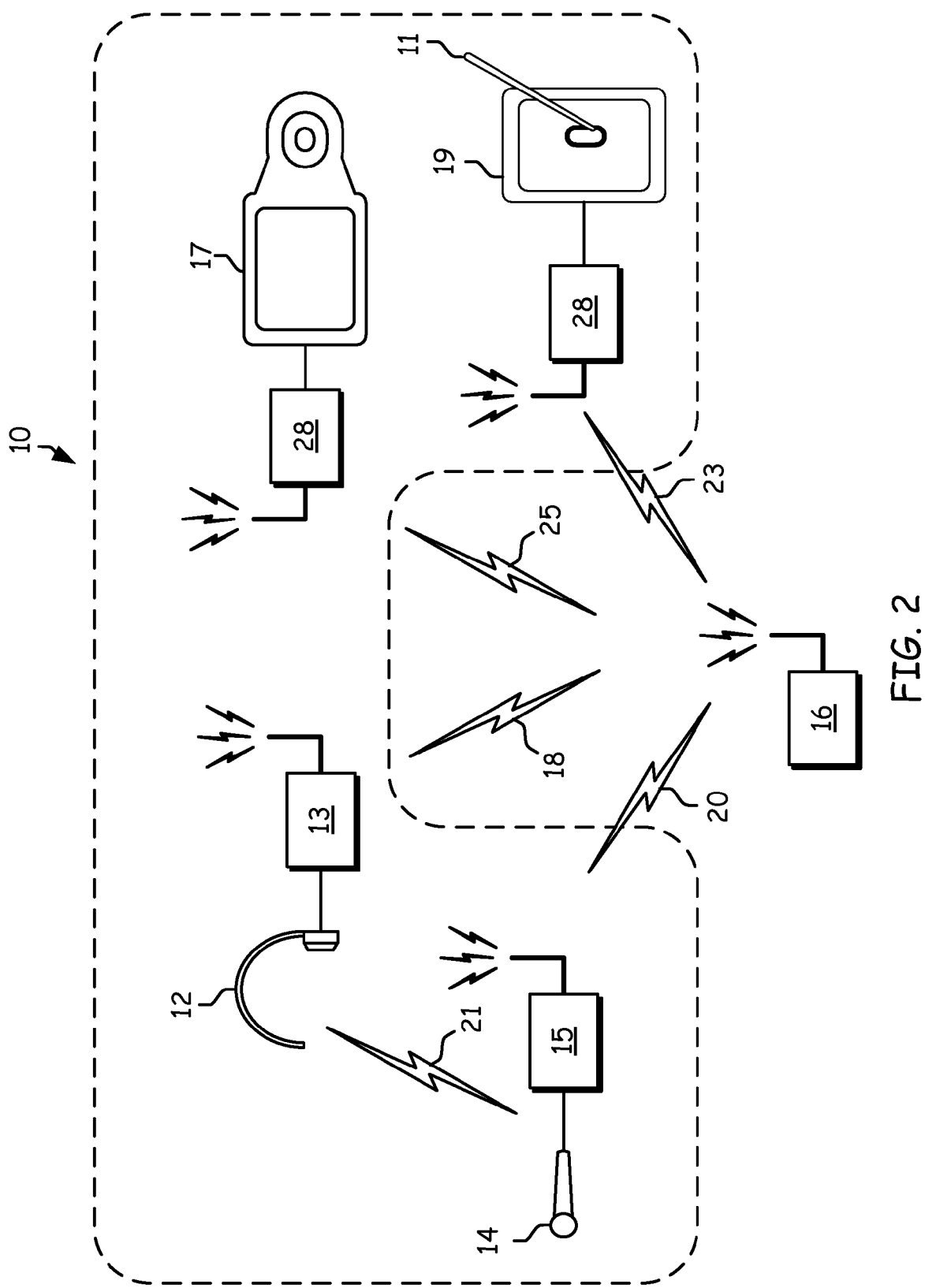
FIG. 2 is a diagram of another modular wireless headset in accordance with one embodiment of the present invention.

FIG. 2 is a diagram of a modular wireless headset that includes earpiece 12, microphone 14. This headset may also include display/camera 17, and portable touch-screen/whiteboard 19 to support net-meetings. Microphone 14, earpiece 12, display/camera 17, and portable touch-screen/whiteboard 19 may each be a separate physical device that communicates wirelessly when paired to form a modular wireless headset. Earpiece 12 is a separate device from microphone 14, that together function to provide the modular wireless headset shown in FIG. 1. Accordingly, earpiece 12, microphone 14, display/camera 17, and a portable touch-screen/whiteboard 19 are separate communication devices that may individually communicate with base units via separate or shared communication pathways. A single communication pathway using time division may be used to communicate between earpiece 12, microphone 14, display/camera 17, portable touch-screen/whiteboard 19 and base units (base units 30-37 or access point 21). These communications are secured by both pairing and registration. Encryption, validation, or other like methods known to those skilled in the art may also be used and support one-way or two-way audio, video or text communications. One way communications allow the headset to act as receivers to broadcast information, while two-way communications allow real-time voice communications, such as phone or radio communications, which may be augmented with data, text, and video to support interactive net-meetings.

Figure 3:
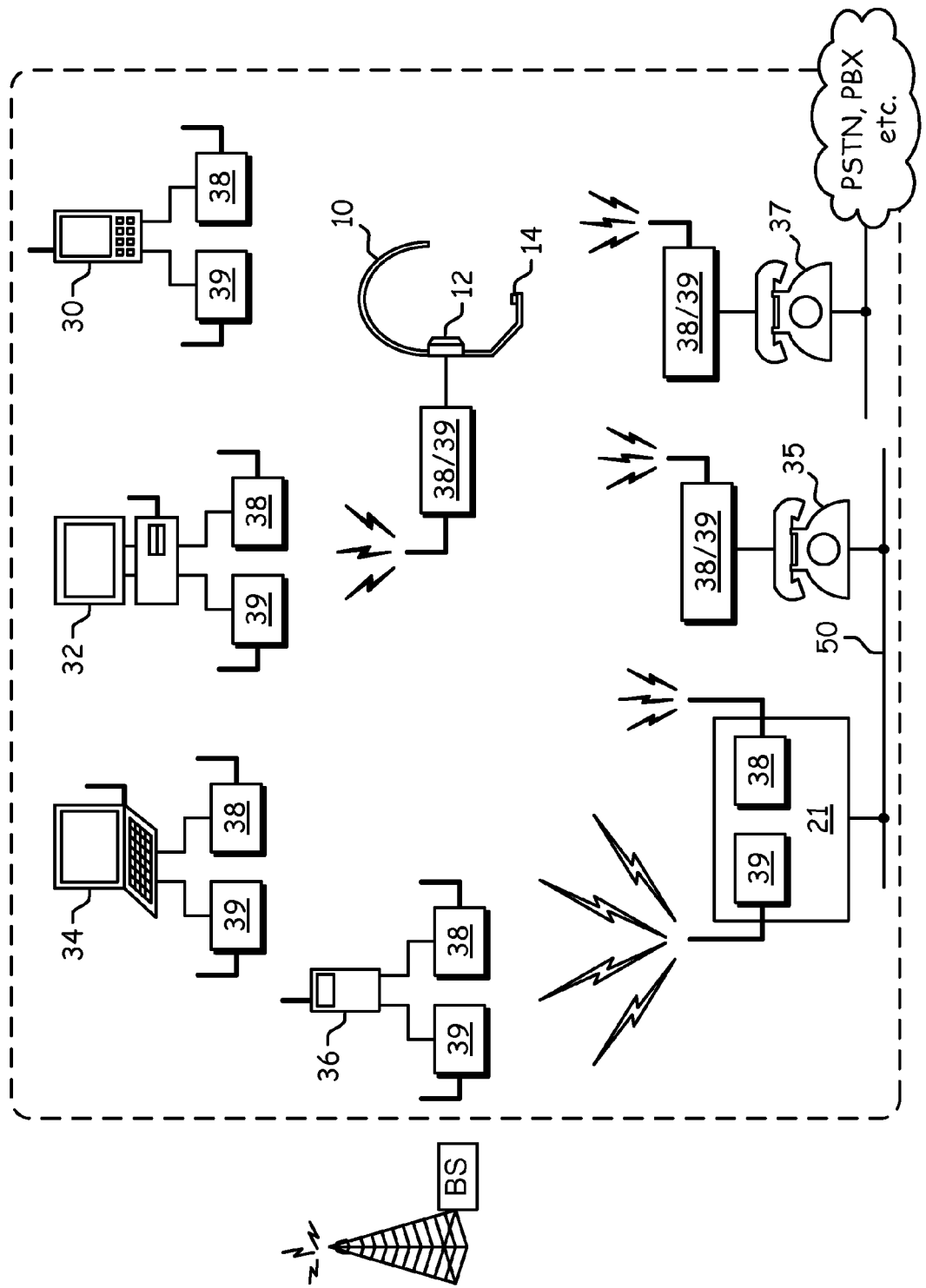
FIG. 3 is a diagram of a wireless headset operable to couple to various devices in accordance with one embodiment of the present invention.

Earpiece 12, once paired to form a modular wireless headset and registered to a base unit, may automatically communicate with base unit 16 and attached resources. FIG. 3 depicts those resources as a cellular telephone network, wire line telephone, Ethernet telephone, laptop computer, personal computer, personal digital assistant, etc, using transceiver (or receiver) 13 via a first communication pathways 18. Base unit 16 may establish a wireless pathway to earpiece 12 or microphone 14. The microphone 14, once authorized or validated, may communicate with the base unit 16 using transceiver (or transmitter) 15 via a second communication pathway 20 or by sharing communication pathway 18 with earpiece 12. Display/camera 17 and portable touch-screen/whiteboard 19 may communicate with the base unit 16 using transceivers (receivers and/or transmitters) 25 and 27 via communication pathways 21 and 23, respectively, or by relaying communications through another wireless component.

If the communication pathways are established in accordance with the Bluetooth specification, communication resources may be different timeslot allocations on the same synchronous connection orientated (SCO) link, or may be separate SCO links. These communication pathways may be secured by encryption, validation, pairing, or other like means to secure the communications exchanged with the base unit. Validation or pairing may prevent unauthorized devices from communicatively coupling to the base unit.

The quality of data provided to these devices may be adjusted according to which devices are actually present and supported. For example, audio quality can be improved and may even support stereo (multi-channel audio). This option may limit resources provided to microphone 14, display/camera 17, or whiteboard 19 to service multi-channel audio. Another example may favor the use of only earphone 12 and display/camera 17 to render streamed video and audio content. To coordinate the presentation of both audio and video in such an example, earphone 12 and display/camera 17 and their received communications may be synchronized to provide a quality viewing experience. Similarly, to coordinate the presentation of multiple audio channels, earphones 12 may be synchronized in order to provide a quality experience. To coordinate the presentation of real-time two-way audio earphones 12 and microphone 14 may be synchronized such that unacceptable delays do not exist within exchanged voice communications. This coordination ensures there is no undue delay between the presentations provided by these individual devices allowing the user to perceive a seamless presentation. This embodiment allows the multimedia device to support net-meetings that require the delivery of complete Internet conferencing solutions with multi-point data conferencing, text chat, whiteboard, and file transfer, as well as point-to-point audio and video. Additionally, this allows the multimedia device to coordinate the presentation of these different media formats without necessarily requiring shared physical connections of these devices.

Direct connectivity previously limited the physical structure that could be used for a wireless headset to support net-meetings. In many cases, this results in headsets that are cumbersome to use and uncomfortable to wear. The protocol used between modular components (base units, host devices, access points and other communicatively coupled devices) may allow the base unit to send data to each device in a coordinated manner that allows for the synchronized presentation of multimedia content by the devices. Alternatively, the information may be supplied to one component and then distributed within the trusted pair devices that make up the modular wireless headset. For example, one embodiment may allocate a predetermined portion of each data transmission for each media format. This would allow base unit 16 to transmit the same data to each device, wherein each device only processes that content intended for that device. In another embodiment, base unit or access point communicates in parallel with each device. By coordinating the data or packets exchanged with the devices, their individual presentations may be synchronized.

Earpiece 12 and microphone 14 may have on-chip operations to support call conferencing, call waiting, flash, and other features associated with telephones or net-meetings. These functions may be accessed and reviewed by a user interface and display within the base unit or a user interface and display located on or coupled to either earphone 12 or microphone 14. The user interface and display, located on or coupled to either the base unit or earphone 12 or microphone 14 may have a display and button(s) that may be used to program device, perform directory functions including selecting number to call, view caller ID, initiate call waiting, or initiate call conferencing. Additionally, circuitry within earphone 12 or microphone 14 may enable voice activated dialing. The actual voice recognition could be performed within earphone 12, microphone 14, or a base unit. Thus, earphone 12 or microphone 14 may act to initiate calls and receive calls. A link between earphone 12 and microphone 14 would allow earphone 12 or microphone 14 to share resources, such as batter life, and allow earphone 12 or microphone 14 to be recharged from a base unit.

Each of the devices 30-37 also includes piconet RF interface 38 and/or wireless interface 39. Piconet RF interface 38 may be constructed to support one or more versions of the Bluetooth specification. As such, each of the piconet RF interfaces 38-36 include a radio frequency transceiver that operates at 2.4 gigahertz and baseband processing for modulating and demodulating data that is transceived within a piconet. As such, wireless headset 10 may be wirelessly coupled with any one of the devices 30-37 and act as the headset communicatively coupled and registered to the devices 30-37.

Devices 30-37 may further include a wireless LAN (WLAN) RF interface 39. The wireless LAN RF interfaces 39 may be constructed in accordance with one or more versions of IEEE802.11 (a), (b), and/or (g) or other WLAN protocol known to those skilled in the art. Accordingly, each of the WLAN RF interfaces 39 include an RF transceiver that may operate in the 2.4 gigahertz range and/or in the 5.25 or 5.75 gigahertz range and further includes baseband processing to modulate and demodulate data that is transceived over the corresponding wireless communication link.

Contrasting the functionality of the piconet RF interfaces with the WLAN RF interfaces, piconet RF interfaces allow point-to-point communication between the associated devices, while the WLAN RF interfaces enable the associated devices to communicate indirectly via base units. For example, via piconet RF interfaces 38 laptop 34 can communicate directly with cellular telephone 36. In contrast, via WLAN RF interfaces 39, laptop 34 communicates indirectly, via access point 21, with cellular telephone 36. In general, the coverage area of a piconet is significantly smaller than the coverage area of a WLAN. Thus, for example, if headset 10 and cellular telephone 36 were unable to establish a piconet connection via piconet RF interfaces 38 due to distance between the devices. These devices would be able to establish a wireless communication link via the WLAN RF interfaces 39 and access point 21. Dual communication pathways allow communications to be switched between pathways, dependent on factors such as audio quality, signal strength, and available bandwidth.

Wireless headset 10 may establish a piconet with any one of the devices 30-37 or with access point 21, which includes WLAN RF interface 39 and piconet RF interface 38. As such, wireless headset 10 may function as the headset for wire line telephone 37, Ethernet telephone 35, personal digital assistant 30, personal computer 32, laptop computer 34, and/or cellular telephone 36 provided a piconet and registration can be established with the device. In accordance with the present invention, if a piconet cannot be established with the particular device, an extended network may be created utilizing the WLAN connectivity and at least one corresponding piconet.

If voice communications are to be serviced via wire line telephone 37 (i.e., the base unit for this example), but headset 10 is at a distance such that a piconet cannot be established between their piconet RF interfaces, and headset 10 is in a range to establish a piconet with cellular telephone 36, the piconet RF interfaces of cellular telephone 36 and headset 10, respectively, would establish a piconet, which may be established in accordance with the Bluetooth specification. With this piconet established, cellular telephone 36, via its WLAN RF interface, establishes a wireless connection with access point 21. Access point 21 then establishes a communication link with wire line telephone 37. Thus, a logical connection is established between headset 10 and wire line telephone 37 via cellular telephone 36 and access point 21. Note that wire line telephone 37 may be directly coupled to LAN 50 or coupled to a private branch exchange (PBX), which in turn is coupled to access point 21. Accordingly, within a wireless geographic area, the range of headset 10 may be extended utilizing the WLAN within the geographic area. As such, headset 10 extends the mobility of its user, extends the range of headset use, and expands on headset functionality while preserving privacy and security by seeking service from base units to which it may be registered. Alternatively, headset 10 may establish a piconet with cell phone 36. This allows cell phone 36 to establish an alternate communication pathway for the communications serviced by wired telephone 37. Then it is possible for the call serviced by telephone 37 or 35 to be "handed off" to cellular telephone 36.

Figure 4:
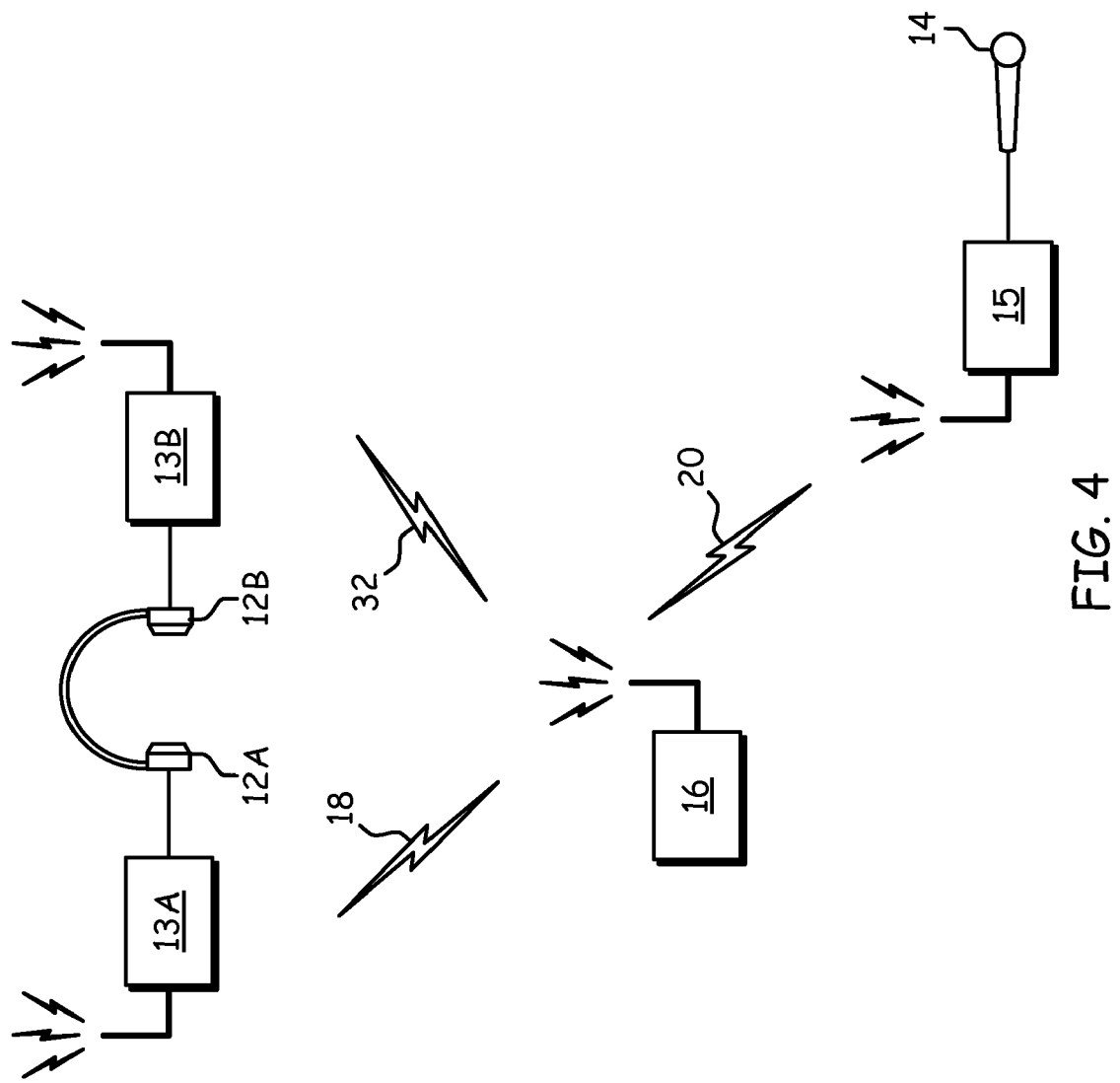
FIG. 4 is a block diagram of a multi-channel wireless headset in accordance with one embodiment of the present invention.

FIG. 4 is a diagram of another embodiment of a modular wireless headset 10 that includes two earpieces 12A and 12B, microphone 14, and user interface 22. In this configuration, microphone 14 communicates with base unit 16 via communication pathway 20, earpiece 12A communicates with base unit 16 using transceiver (or receiver) 13A via communication pathway 18 and earpiece 12B communicates with base unit 16 using transceiver (or receiver) 13B via communication pathway 32. Alternatively, earpieces 12A and 12B, and microphone 14 may establish a piconet and communicate with base unit 16 via a single communication pathway.

Figure 7:
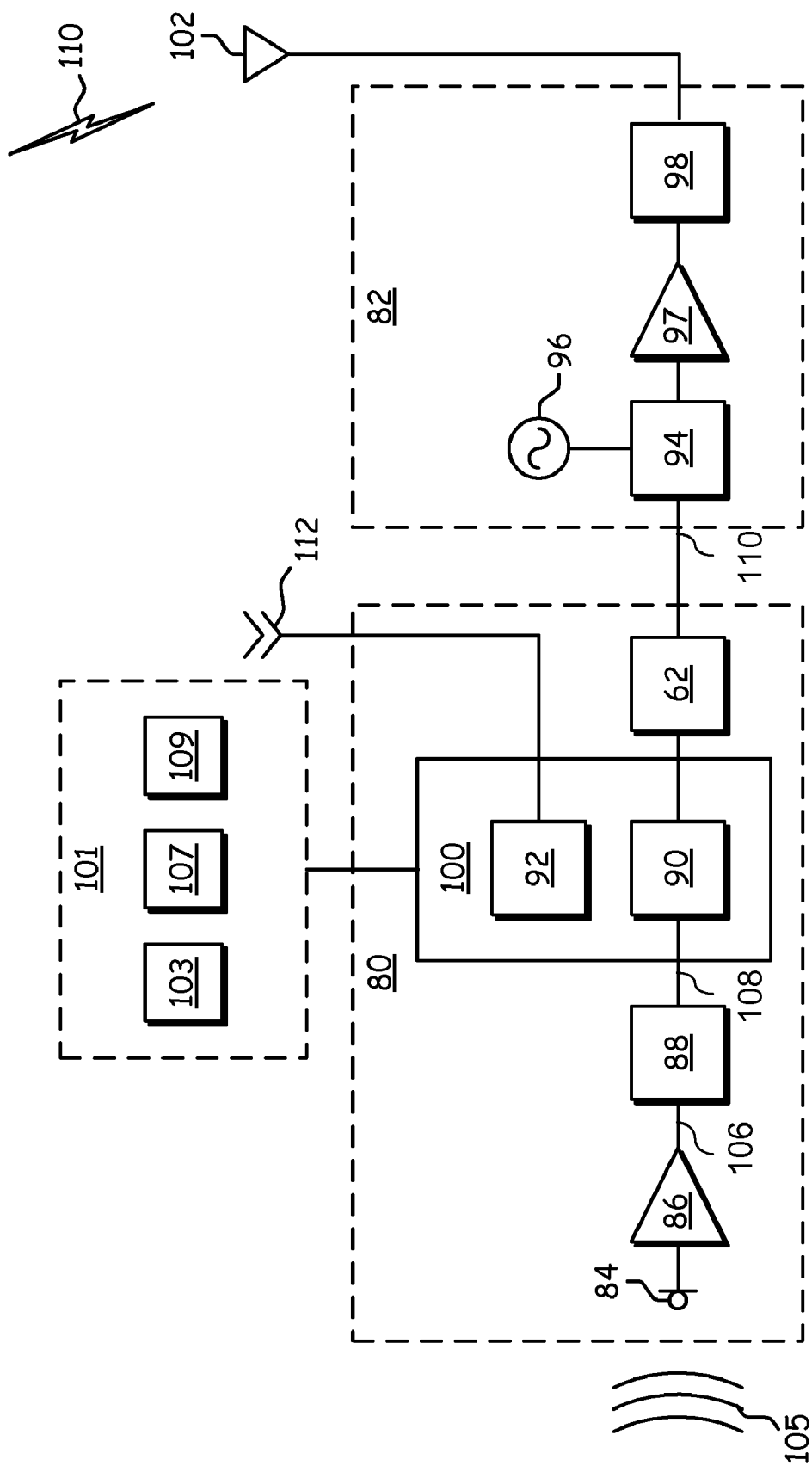
FIG. 7 is a functional block diagram of a wireless microphone in accordance with one embodiment of the present invention.

In operation, voice produced by the individual using microphone 14 is received via a microphone transducer and converted into RF signals by circuitry within microphone 14, as shown in FIG. 7. These RF signals are provided to base unit 16 via the previously identified communication pathways. Base unit 16 includes a corresponding receiver antenna 46 and receiver module to recapture the audio signals received via communication pathways 18, 20 and 32. In addition, base unit 16 includes at least one transmitter to transmit audio information to the earpiece(s) 12A and 12B. In one embodiment, base unit 16 may transmit left channel stereo information to earpiece 12A and right channel stereo information to earpiece 12B. In addition to receiving outgoing voice communications, microphone 14 may also receive voice commands that are recognized and executed by processing modules within the modular headset. The processing of these commands will be discussed in further detail with reference to FIG. 7.

Wireless headphone(s) may be realized by omitting microphone 14 and including either one or both of earpieces 12A and 12B. In this embodiment, base unit 16 may be a playback device such as a CD player, DVD player, cassette player, etc. operable to stream audio information. If the display of FIG. 2 is utilized as well, both streaming audio and video may be enjoyed by the user.

Figure 5:
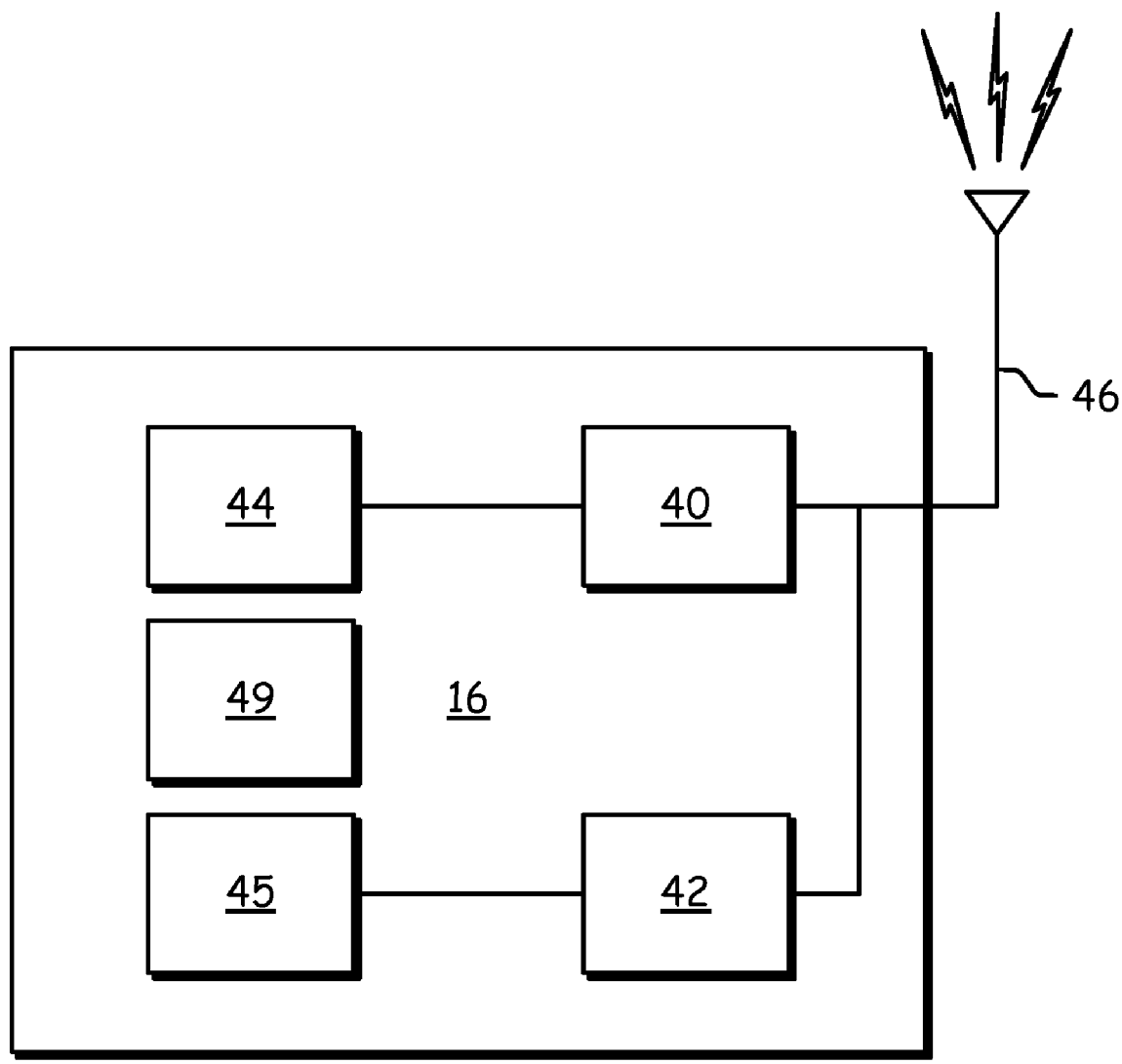
FIG. 5 is a schematic block diagram of an access point in accordance with one embodiment of the present invention.

FIG. 5 is a diagram of a base unit that supports modular wireless multimedia devices. Base unit 16 includes a combination of transmitter and receiver (or transceiver) modules that accept and modulate or demodulate streamed audio, video, text, or data to and from earpiece(s) 12 and microphone 14, display 17 and whiteboard 19 through antenna 46. The base unit may be incorporated within or operably couple to another device such as a playback device, laptop, cellular telephone, land based telephone or other like device known to those skilled in the art. For example, one embodiment has transmitter module 40 and receiver module 42.

Base unit 16 also includes registration circuit 49 with which to compare registration information contained in memory available to base unit 16 and registration information received from headset 10. Registration may occur by physically coupling or docking headset 10 to the base unit or may occur wirelessly. Registration allows a trusted relationship to be established between base unit 16 and headset 10. This relationship ensures privacy and security of communication service by the wireless connection between base unit 16 and headset 10. This trusted relationship utilizes a pass key or other like means of verification to ensure that base unit 16 and headset 10 have permission to access one another. Once the trusted relationship is established through registration, the re-initialization of that relationship is not necessary in order to service communications between base unit 16 and headset 10. The registration information to be exchanged and compared may include voice patterns, biometric information, user tactile inputs in response to stimuli, password, voice recognized input, audio or video tests, encryption keys, handwriting recognition inputs, third party verification and testing, proximity information or other like information known to those skilled in the art. This same set of information may also be used in the previously identified paring process.

Transmitter module 40 accepts voice communications or unmodulated streamed audio, video, data or text from a servicing network or playback device 44 (e.g., DVD player, MP3 player, CD player, cassette player, or other like devices known to those skilled in the art). Playback device 44 may be integrated within base unit 16. Transmitter module 40 then modulates the streamed audio into low intermediate frequency (IF) signal. In the case where two earpieces are employed, multiple transmitter modules or time separation may be employed to modulate the streamed audio into low IF signals for the earpieces for each channel (i.e. left and right channels of stereo transmissions). These multiple signals are synchronized in their presentation to a user. Similarly, receiver module 42 accepts modulated streamed audio, video, data or text from multimedia device 10. Receiver module 42 recovers signals from the received low IF signals. The recovered signals are then relayed to the servicing network or presentation device 45. Note that the generation of low IF signals and subsequent demodulation to recapture audio signal may be done in accordance with a particular wireless communication standard. For example, the Bluetooth specification may be used, IEEE802.11(a), (b), and/or (g) may also be used, etc. when base unit 16 couples to a telephone network (PSTN, cellular, satellite, WLAN, VOIP, etc.). Base unit 16 may receive data associated with the command as well. For example, caller ID information may be passed to user interface 22 or enhanced call operations may be initiated based on input received at the user interface.

Figure 6:
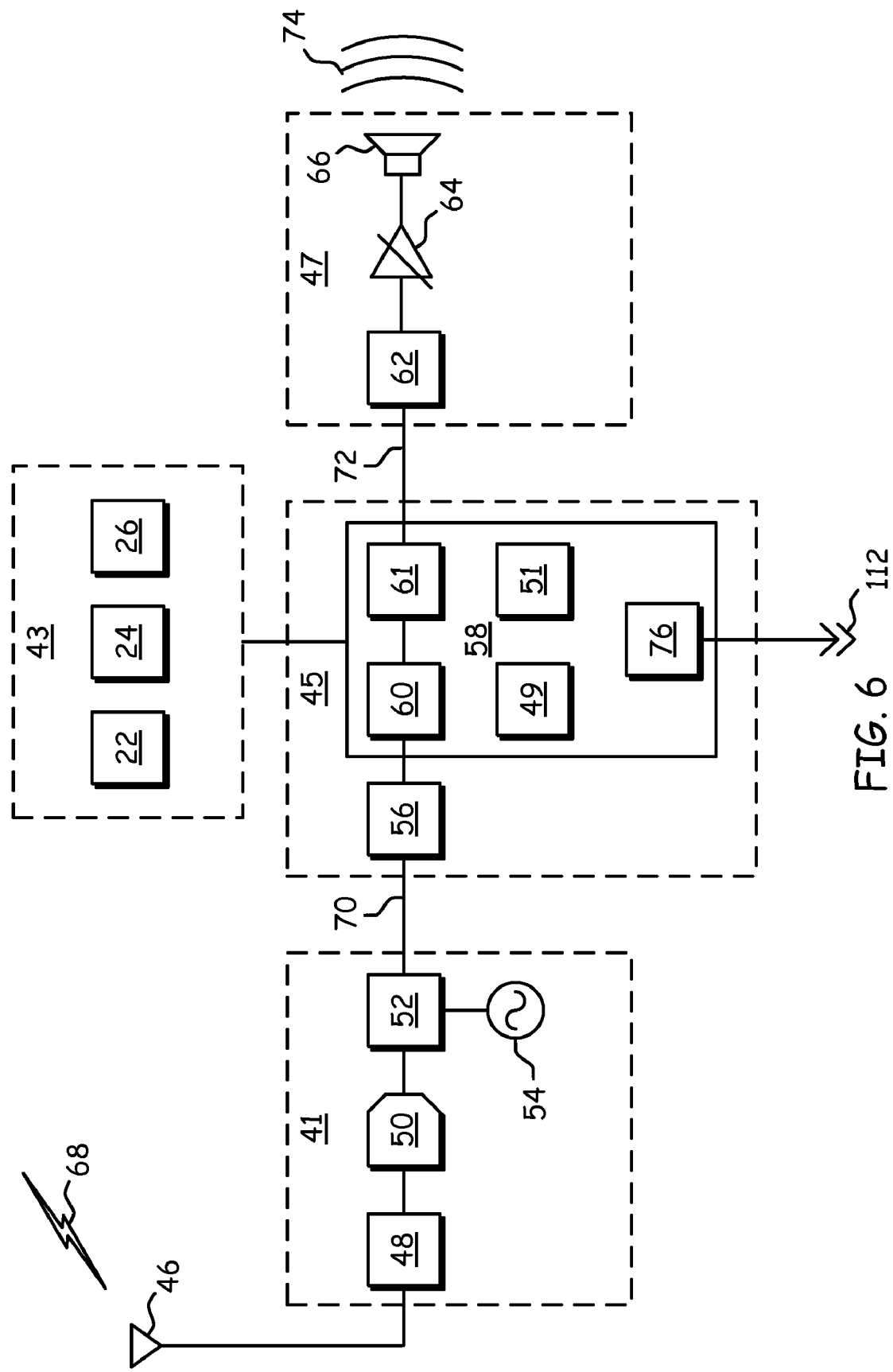
FIG. 6 is a functional block diagram of wireless earpiece in accordance with one embodiment of the present invention.

FIG. 6 is a schematic block diagram of earpiece 12. Earpiece 12 includes receiver module 41, optional user interface 43, processing module 45, and speaker module 47. Receiver module 40 includes antenna 46, bandpass filter 48, low noise amplifier 50, down converter 52 and local oscillator 54. User interface 43 can be any combinations of a visual interface as evidenced by display 22, tactile interface as evidenced by buttons 26, and/or an audio interface represented by microphone/speaker and may operably couple to processing module 58 to initiate call functions or playback functions which will be described further in FIG. 10.

Processing module 45 performs data recovery and includes an analog-to-digital converter (ADC) 56. The processing module also includes pairing circuit 49 and registration circuit 51. Digital channel filter 60 and demodulator 61 process the recovered signal while setup module 76, pairing circuit 49 and registration circuit 51 act to establish secure, private communications path with trusted devices and the base units. Speaker module 47 includes a digital-to-analog converter (DAC) 62, variable gain module 64, and at least one speaker 66 to render recovered communications.

Once the piconet is configured and trusted relationships are established, receiver module 41 receives inbound RF signal 68 from base unit 16 via antenna 46. Bandpass filter 48 filters the received RF signal 68 which are subsequently amplified by low noise amplifier 50. Down converter 52 converts the filtered and amplified RF signal 68 into low intermediate frequency (IF) signal 70 based on a local oscillator 54. Low IF signals 70 may have a carrier frequency at DC ranging to a few megahertz.

Processing module 45 receives low IF signals 70 and converts the low IF signals 70 into digital signals via ADC 56. Processing module 45 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11 (a), (b), and/or (g) may also be used, etc.

Speaker module 47 converts digital audio signal 72 into analog signals rendered to the user through speakers 66. Adjustable gain module 64 adjusts the gain (i.e., adjusts volume), and provides the amplified signals to speaker 66, which produces audible signals 74. As long as the piconet remains in place between earpiece 12 and base unit 16, earpiece 12 will produce audible signals 74 from received inbound RF signal 68.

FIG. 7 is a schematic block diagram of microphone 14 that includes audio input module 80, transmitter module 82 and user interface 101. Audio input module 80 includes microphone 84, amplifier 86, ADC 88, processing module 100 that includes a setup module 92 and modulator 90, and DAC 62. Setup module 92 further includes a pairing circuit and an optional registration circuit to establish secure, private communications as previously described. User interface 101 can be any combinations of a visual interface as evidenced by display 103, tactile interface as evidenced by buttons 107, and/or an audio interface represented by microphone/speaker 109 and may operably couple to processing module 100 to initiate call functions which will be described further in FIG. 10. Transmitter module 82 includes up-converter 94, local oscillator 96, power amplifier 97, bandpass filter 98, and antenna 102.

ADC 88 couples to microphone 84 where ADC 88 can produce a digital audio signal from the analog audio signals captured by the microphone. Multiple CODECs may be used. For example, a voice recognition software (VRS) codec may be used when the ADC operates in a voice command mode. Alternatively, a voice codec that supports voice communications may be used when the ADC is operating in a voice mode. The user may be able to select in the voice command mode with a one-touch button or other user interface causing the ADC to utilize a separate codec for the voice command mode. ADC 88 may be located either in microphone 14 or within earpiece 12.

In another embodiment ADC 88 may in fact be two or more ADCs that are coupled to the microphone transducer. In such a case, the first ADC would be operable to produce digital audio signals from the analog audio signals captured by the microphone in accordance with the VRS CODEC. The second ADC operating in parallel with the first supports voice communications with a separate voice codec. These ADCs may be contained or coupled to processing module 100.

These voice commands may be used to implement many functions. These functions may include, but are not limited to, network interface functions, base unit interface functions, directory functions, caller I.D. functions, call waiting functions, call conferencing functions, call initiation functions, device programming functions, and playback device functions. Additionally, the user voice commands may be used to initiate, validate, and/or authenticate a servicing network and the formation of a trusted relationship between modular components such as microphone 14 and earpiece 12.

Once microphone 14 is configured within a piconet, microphone 84 to receives audio signals 105 and converts these signals to analog signals 106. Amplifier 86 amplifies analog audio signals 106 that ADC 88 then converts into digital audio signals 108. Modulator 90 modulates the digital signals based on a predetermined communication standard. As shown, modulator 90 and setup module 92 are implemented within processing module 100. Processing module 100 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently processed by bandpass filter 98. The filtered RF signals are then transmitted via antenna 102 as outbound RF signals 110 to base unit 16. As long as the piconet is established to include microphone 14 and base unit 16 in a trusted pair, microphone 14 may transmit to base unit 16 in the manner described.

As shown in both FIGS. 6 and 7, separable connector 112 may physically connect setup modules 76 and 92. Such a physical connection allows for earpiece 12 and microphone 14 to communicate in both directions with the base unit. For example, if the devices are compliant with one or more versions of the Bluetooth Specification, base unit 16, functioning as the master, may issue a registration request to earpiece 12 coupled to microphone 14. Upon receiving this request, earpiece 12 and microphone 14 respond to the request indicating that RF channel(s) be established for the headset. Based on these responses, the master coordinates the establishment of the pathways and provides synchronization information through earpiece 12 and microphone 14 via receiver module 40 of earpiece 12. Setup modules 76 and 92 coordinate the registration of earpiece 12 and microphone 14 with the base unit, pairing of earpiece 12 and microphone 14, as well as coordinating timeslot assignments and/or SCO link assignments. Once the physical connection between earpiece 12 and microphone may be severed to establish earpiece 12 and microphone 14 as separate pieces.

Alternatively, earpiece 12 and microphone 14 may each directly couple to the base unit to accomplish this setup.

Figure 8:
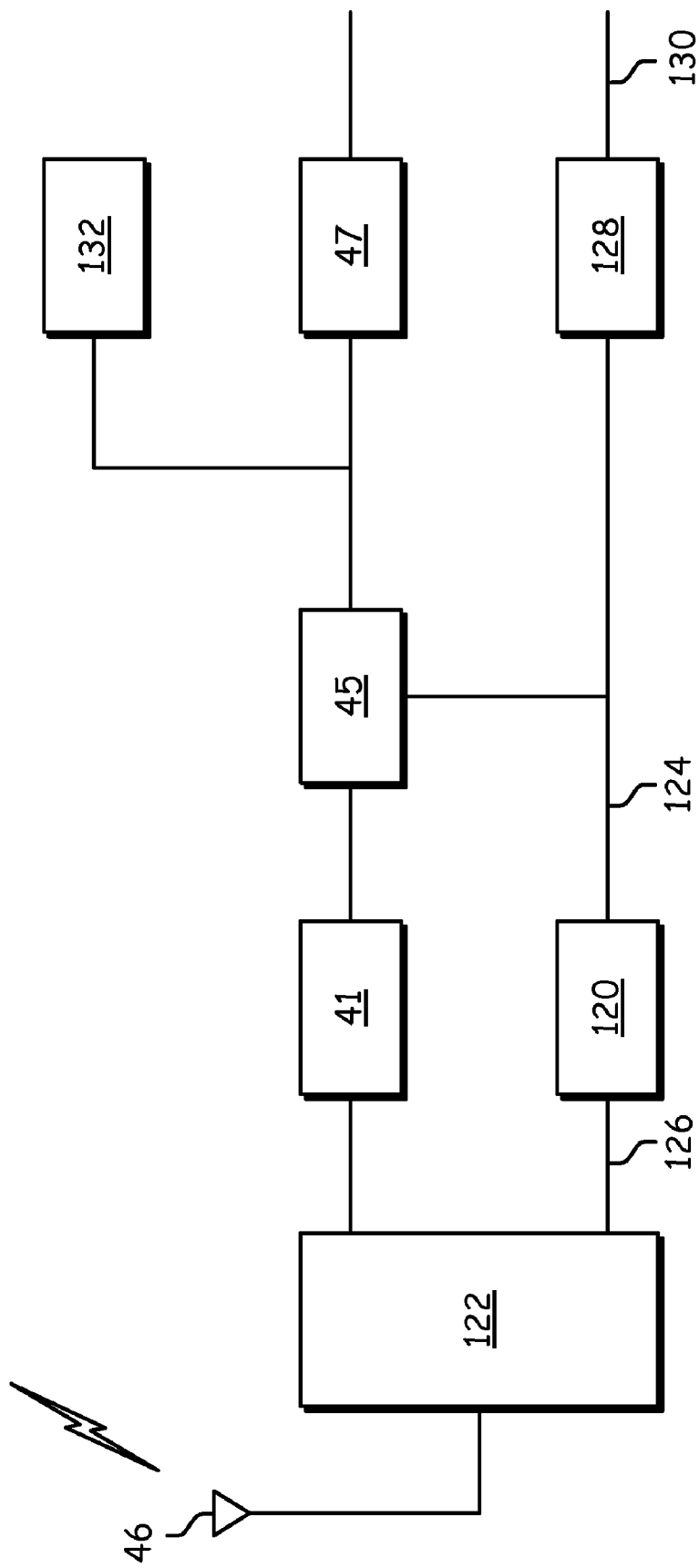
FIG. 8 is a schematic block diagram of a wireless microphone in accordance with the present invention.
Figure 9:
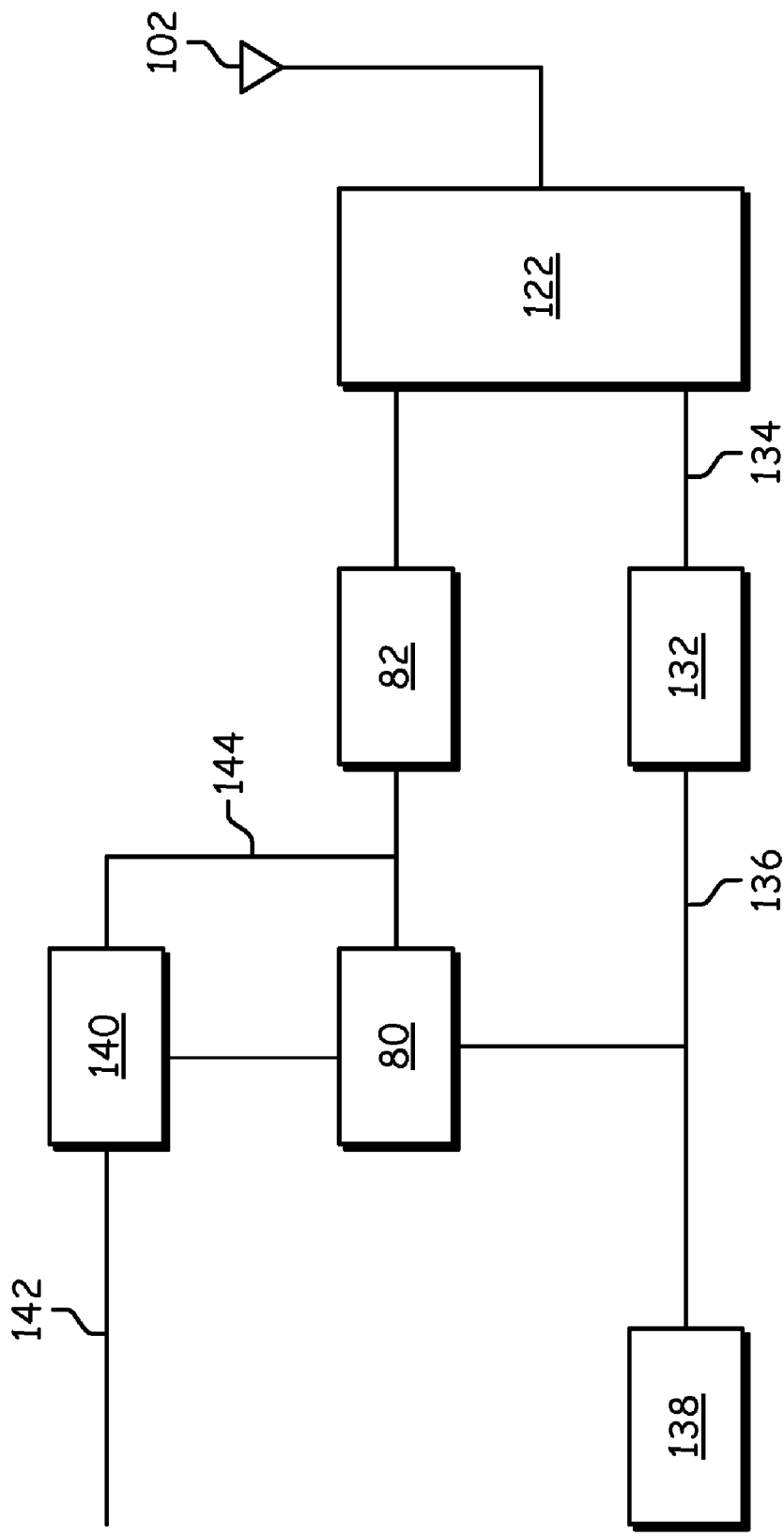
FIG. 9 is a schematic block diagram of a wireless microphone in accordance with the present invention.

FIGS. 8 and 9 illustrate schematic block diagrams of earpiece 12 and microphone 14 that include transceiver modules (i.e., receiver modules and transmitter modules). The use of the transceiver modules allow earpiece 12, microphone 14 and base unit 16 to be physically separate devices and be configured, paired and registered using wireless communications. As such, earpiece 12 and microphone 14 may be continuously worn on a person for receiving incoming calls and/or placing outgoing calls.

Earpiece 12, as shown in FIG. 8, includes antenna 46, transmit/receive switch 122, receiver module 41, processing module 45, speaker module 47, transmitter module 120, input module 128 and display module 132. Receiver module 41, processing module 45, and speaker module 47 operate as discussed with reference to FIG. 6. Processing module 45 may also produce display information for display module 132. For instance, the received RF signal may include information such as caller ID, command information, etc. which is separated by processing module 45 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

Processing module 45 receives digital command messages 124 and, when applicable, processes the command messages. For example, if the command message is with respect to a volume adjust; a graphical representation of adjusting the volume may be presented on display module 132 and the gain of amplifier 64 adjusted to adjust the volume associated with speaker 66. This command may also initiate pairing and registration.

Transmit module 120 receives digital command messages 124 and converts these messages into outbound RF command signals 126, which are subsequently transmitted to base unit 16 and/or microphone module via antenna 46. Accordingly, by including transmitter module 120 along with receiver module 41, earpiece 12 may function as a master and/or slave and exchange/relay data for other components.

FIG. 9 is a schematic block diagram of microphone 14 that includes audio input module 80, transmitter module 82, transmit receive switch 122, antenna 102, receiver module 132, input module 140 and display module 138. Input module 140 is operable to receive user input commands 142, including voice commands and convert these commands into digital command messages 144. In the case of voice commands, the combination of audio input module 80 and input module 140 include one or more ADCs, such as previously described ADC 88 operable to processed transduced audio communications with a voice CODEC and voice commands with a voice recognition software (VRS) CODEC.

Input module 140 couples to or includes a user interface that allows a user to initiate call functions or network hardware operations, such as pairing and registration. Network interface functions may include base unit interface functions, component interface functions, directory functions, caller ID functions, voice activated commands and device programming functions. This user interface can be any combinations of visual interface(s), tactile interface(s), and/or an audio interface(s) that allow the user to input commands 142. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 132 via antenna 102. Display module 138, which may be a LCD display, plasma display, etc., receives digital command messages 136, and may display corresponding configuration messages. In addition, any display information received from the host and/or microphone module regarding setup, operation, or as part of the data content, may be displayed on display module 138.

Figure 10:
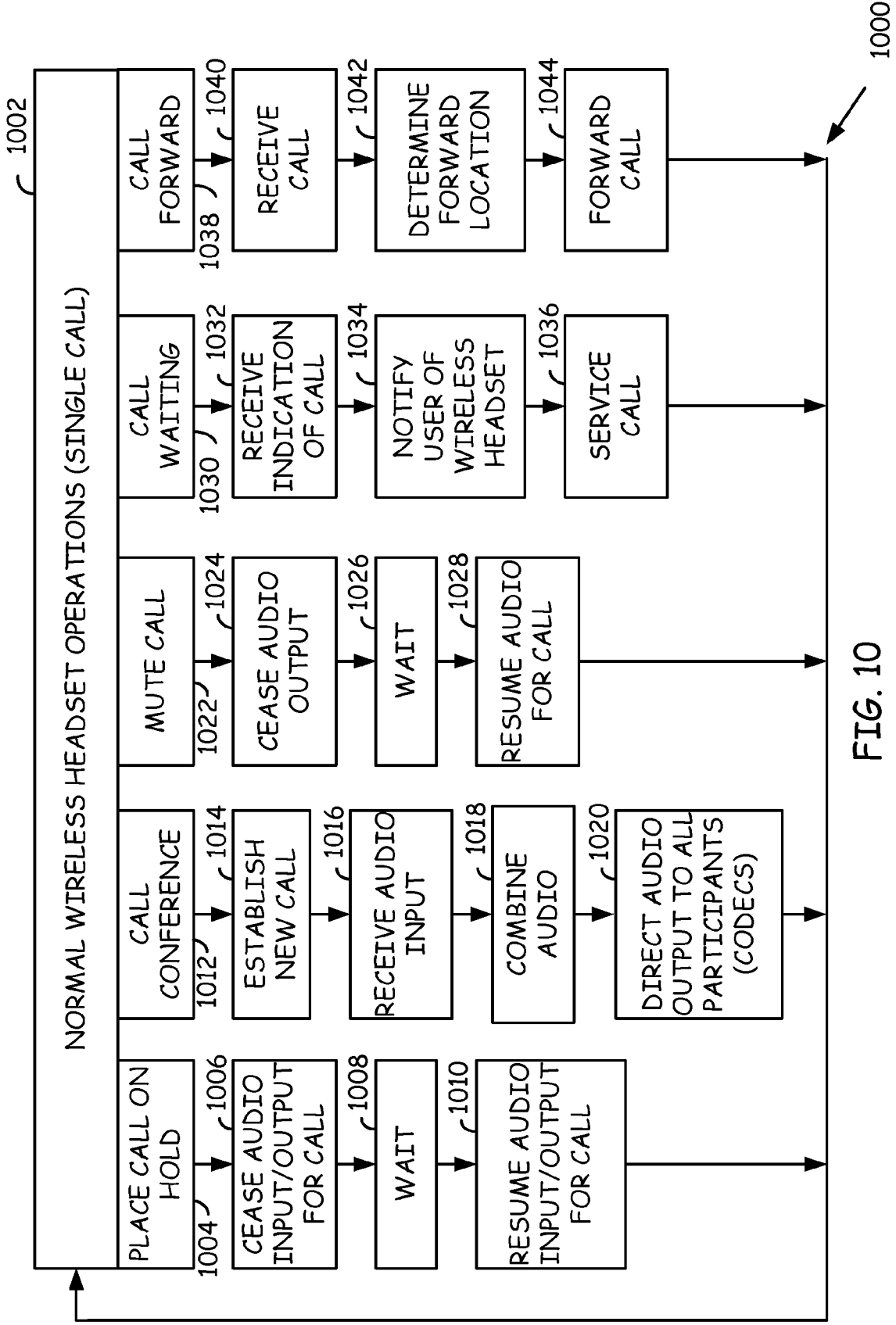
FIG. 10 is a logic diagram illustrating operation of a wireless headset in performing call management.

FIG. 10 is a logic diagram illustrating operation of a wireless headset constructed according to the present invention in serving voice communications while providing call management. The operations described with reference to FIG. 10 may be performed whole or in part by an on-chip processor within or coupled to processing modules 58 and 100 of FIGS. 6 and 7. During normal operations, the wireless headset services normal operations, e.g., single call or device playback. Other modular devices, such as those of FIG. 2 that couple to the microphone or headset, may perform these operations. These functions may be implemented by voice commands recognized by the VRS CODEC as discussed with reference to FIGS. 7 and 9.

One particular operation that the wireless headset may perform is to place a call on hold (step 1004). In such case, the wireless headset ceases producing audio input and audio output for the call (step 1006). These operations are continued during a wait state (step 1008) until normal operations are resumed for the call (step 1010). From step 1010, operation proceeds to step 1002. The call hold operations of steps 1004-1010 may be performed in conjunction with the other operations of FIG. 10, e.g., call waiting, call muting, call conferencing, etc.

Call conferencing (step 1012) may be initiated by the wireless headset or by a master device if the wireless headset does not have sufficient user interface for call conferencing initiation. In such case, a new call is established by the wireless headset (step 1014). This new call may be serviced by the additional channels serviced by the wireless headset. As was previously described, the wireless headset supports multiple channels. Using this multiple channels, the wireless headset receives audio input from all participants (step 1016) and combines the audio input, along with the input generated by the user of the wireless headset. The wireless headset then directs the combined audio to all participants (their servicing CODECs at step 1020). Note that these operations are continually performed for the duration of the conference call.

The wireless headset may also mute calls (step 1022). In such case, the wireless headset simply ceases all audio output (1024) and waits for the user of the wireless headset to cease the muting operations (step 1026). When the muting has been ceased, the wireless headset resumes the audio servicing of the call (step 1028).

The wireless multimedia device also performs call waiting operations (step 1030). In such case, the wireless multimedia device receives an indication that a call is inbound (step 1032). However, instead of immediately servicing the call, the wireless multimedia device notifies the user of the wireless multimedia device of the call (step 1034), e.g., provides a beeping indication to the user of the wireless multimedia device. The wireless multimedia device then services the call (step 1036), at the direction of the user to either complete the call, have the call join a currently serviced call (via call conferencing operations in some cases), or to ignore the call.

The wireless multimedia device may also perform call forwarding operations according to the present invention (step 1038). In such case, the wireless multimedia device receives the call (step 1040). However, instead of servicing the call, the wireless multimedia device determines a forwarding location for the call (step 1042) and then forwards the call (step 1044). Operation from steps 1010, 1020, 1028, 1036, and 1044 return to step 1002.

Figure 11:
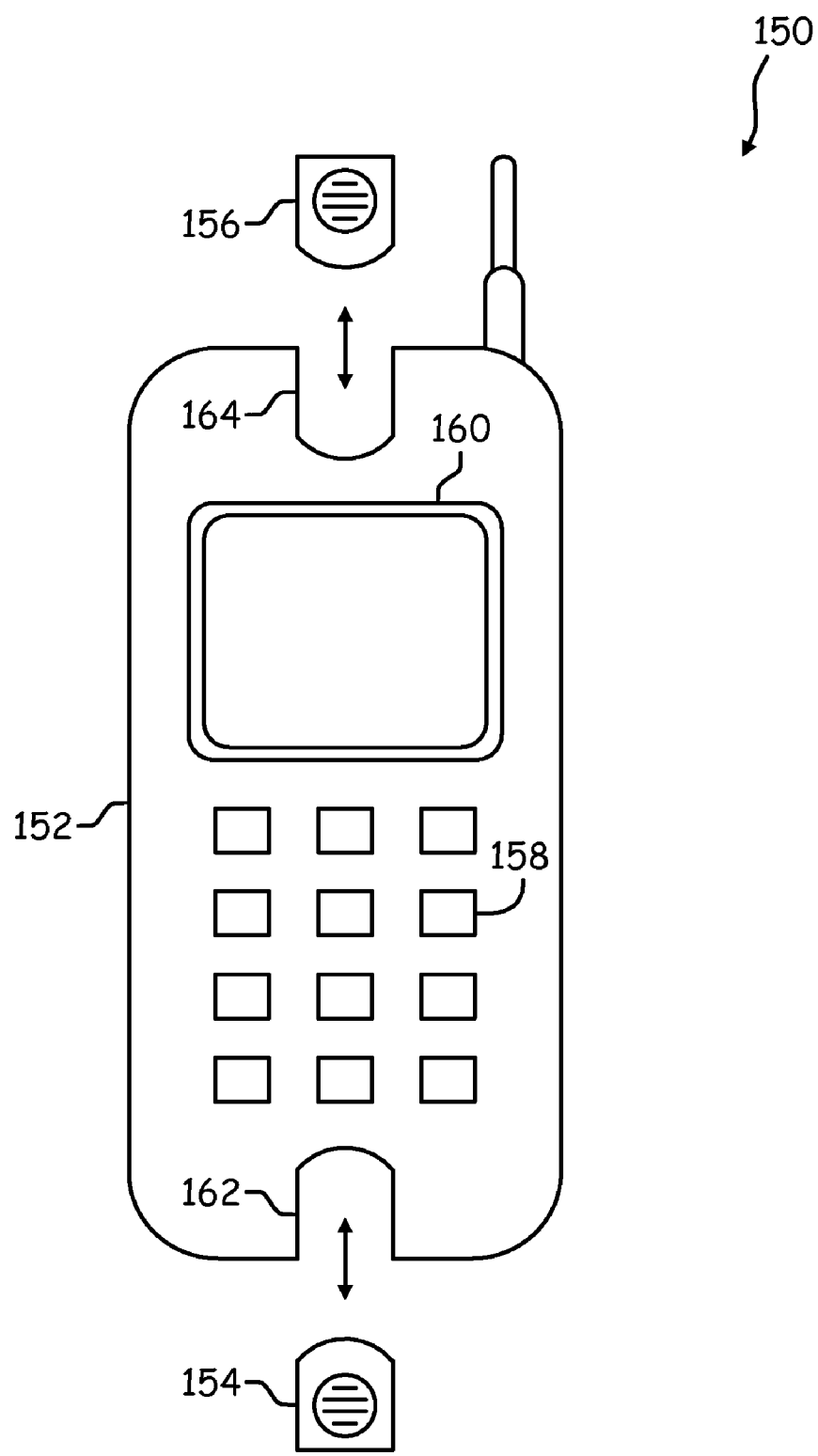
FIG. 11 is a diagram of a modular communication device in accordance with one embodiment of the present invention.

FIG. 11 is a schematic block diagram of modular communication device 150, such as a wireless terminal (e.g., cell phone or wireless packet data phone) that includes host device (base unit) 152, detachable microphone 154 and detachable earpiece 156. In this embodiment, modular communication device 150 may function as a typical device (e.g., cellular telephone, CD player, cassette player, etc.) when detachable earpiece 156 and detachable microphone 154 are physically connected to host device 152. When detachable earpiece 156 is not in physical contact with host device 152, a wireless connection couples detachable earpiece 156 and host device 152. Similarly, when detachable microphone 154 is detached from host device 152, a second wireless connection couples detachable microphone 154 and host device 152. Alternatively, when detachable earpiece 156 and/or detachable microphone 154 are physically coupled to host device 152, they may communicate via a physical or wireless link. At this time, they may be paired and registered as well to the host device. As one of average skill in the art will appreciate, modular communication device 150 may include multiple detachable earpieces 156. In addition, modular communication device 150 may omit detachable microphone 154 if host device 152 is a playback type device (e.g., DVD player, CD player, cassette player, etc.). Similarly, modular communication device 150 may omit detachable earpiece 156 when functioning as a recording device (e.g., dictaphone). Detachable earpiece 156 and microphone 154 may have on-chip operations to support call conferencing, call waiting, flash, and other features associated with telephones. These functions may be accessed and reviewed by a user interface 158 and display 160 within host device 152 or a user interface and display located on either detachable earpiece 156 or microphone 154. The user interface and display, located on either the host device or detachable earpiece 156 and microphone 154 may have a display and button(s) that may be used to program device, perform directory functions including selecting number to call, view caller ID, initiate call waiting, or initiate call conferencing. Additionally, circuitry within the earpiece 156 and microphone 154 may enable voice activated dialing. The actual voice recognition could be performed within earpiece 156, microphone 154, or host device 152. Thus, earpiece 156 and microphone 154 may act to initiate calls and receive calls.

A link between earpiece 156 and microphone 154 would allow earpiece 156 and microphone 154 to share resources, such as battery life, and allow earpiece 156 and microphone 154 to be recharged from host device 152. Earpiece/microphone/base portion are included with cell phone battery. Cell phone battery has openings 162 and 164 located therein for storage/recharging of earpiece 156 and microphone 154.

When located in these openings, the earpiece/microphone will be recharged from the cell phone battery. The new cell phone battery may include base portion RF interface and interface to cell phone port. Existing cell phone port technology could be used to treat the earpiece/microphone in the same manner as wired earpiece/microphone is treated.

Figure 12:
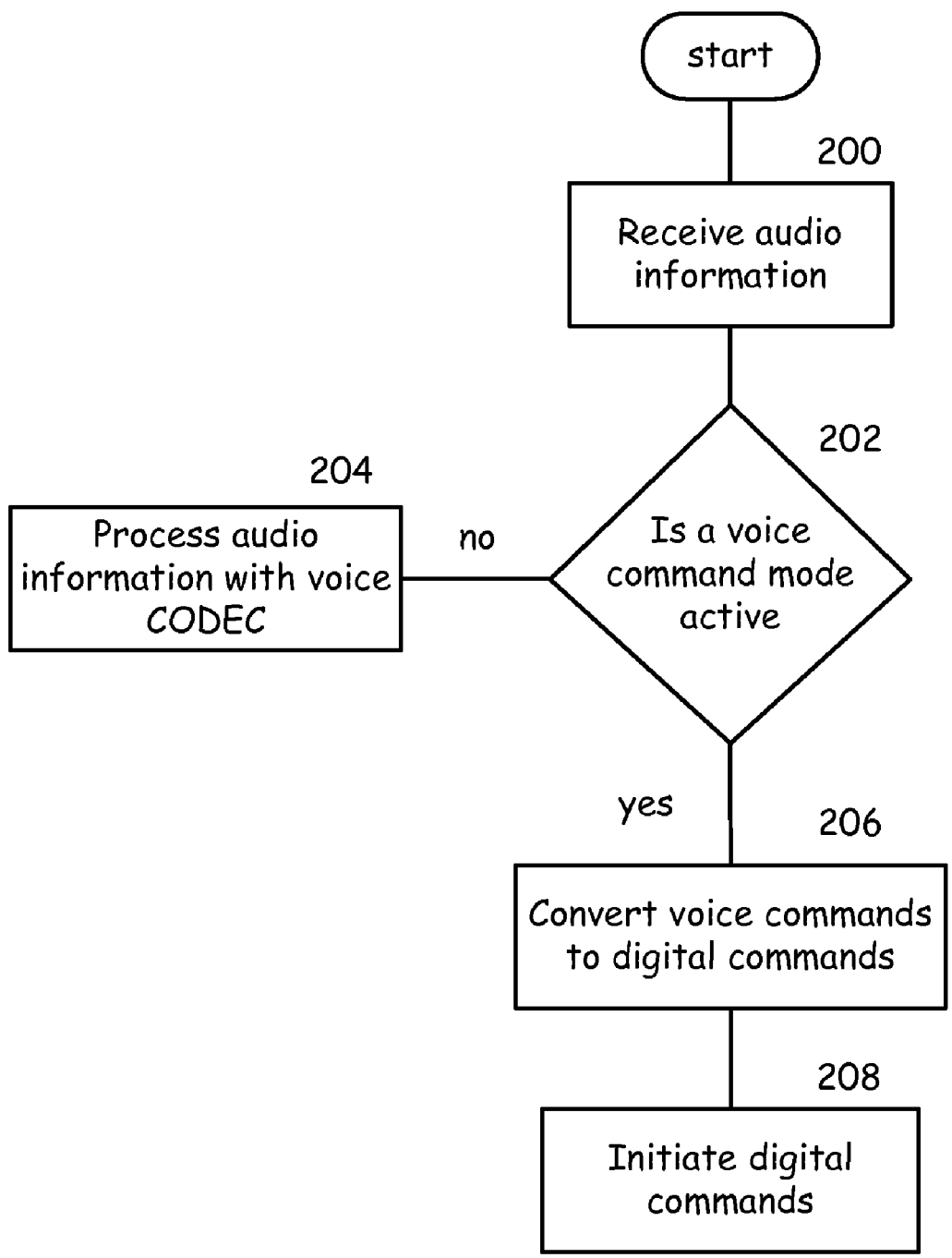
FIG. 12 is a logic diagram of a method for servicing voice communication with a headset in accordance with one embodiment of the present invention.

FIG. 12 is a logic flow diagram of a method of servicing voice communications between a destination terminal and modular wireless headset. During normal operations audio information from the user is received through a microphone as described previously with reference to microphone 14. This audio information is received in step 200. As previously described, a user may activate a voice command mode with a one-touch button or other like interface known to those having skill in the art. Thus, at decision point 202 a determination is made as to whether or not a voice command mode is active or selected. If the voice command mode is not active normal operations and servicing of the audio communications will continue utilizing a voice CODECs in step 204. However, should a voice command mode be activated at decision point 202, ADCs utilizing a VRS CODEC will convert the voice commands, audio communications received through the microphone, into digital commands in step 206. These digital commands are used in step 208 to initiate specific functions such as enhanced call features, equipment features, network functions, or other like features.

Figure 13:
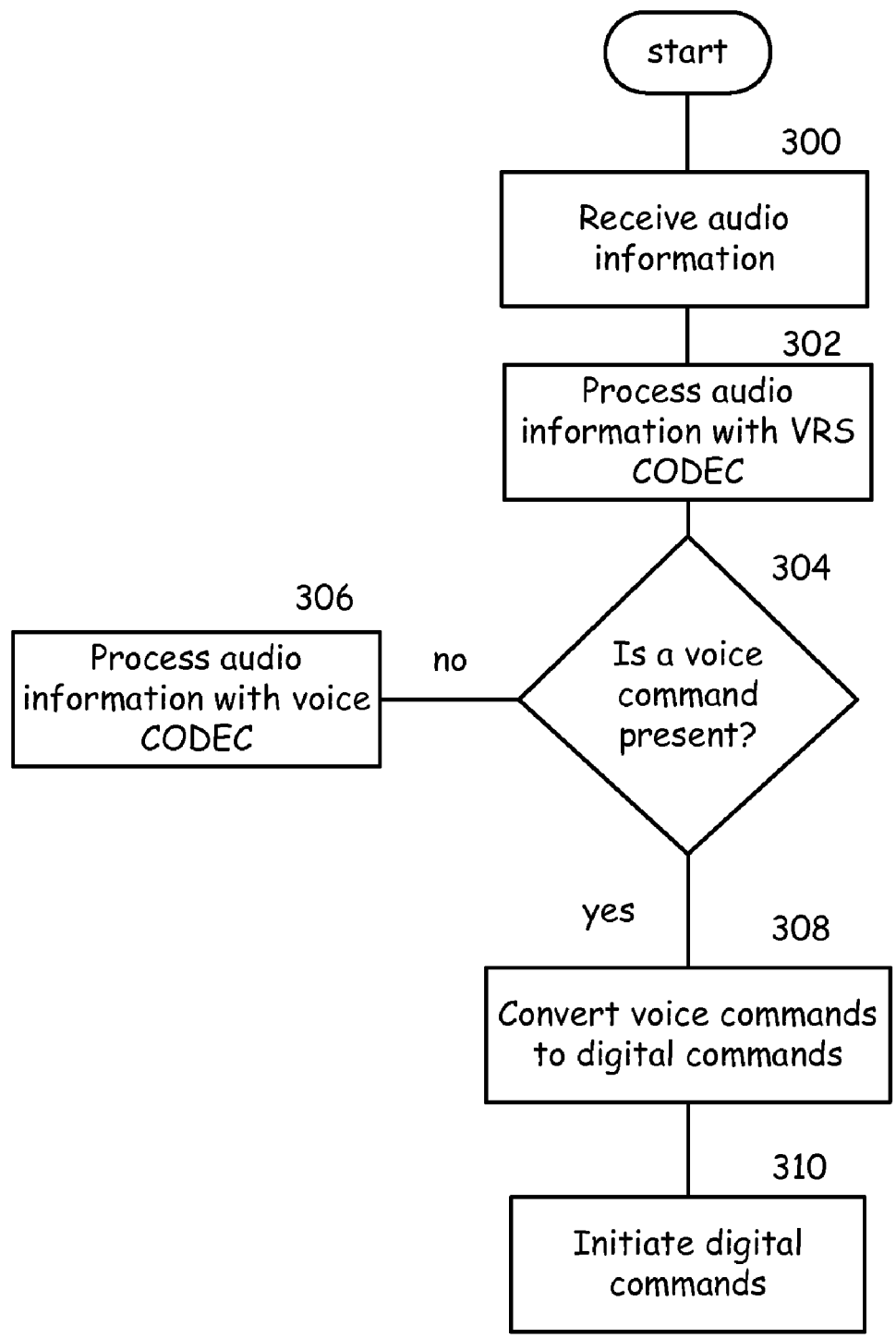
FIG. 13 is a logic diagram of a method for servicing voice communication with a headset in accordance with one embodiment of the present invention.

FIG. 13 provides a second logic flow diagram, however, in this case multiple ADCs are present wherein each ADC is operable to process received audio information. In step 300, audio information is received by the multiple ADCs. A first ADC may process the audio information with a VRS CODEC in step 302 then a determination may be made at decision point 304 as to whether or not a voice command is present within the processed audio information. If not, the audio information may be processed using a voice CODEC in step 306 and the call for other audio communications will continue to be normally serviced. Should a voice command be present as determined at step 304, the voice command will be converted into a digital command in step 308, after which the digital command may be initiated in step 310. Although described as occurring in series in FIG. 13, the processing by the multiple ADCs utilizing multiple CODECs may occur in parallel.

In summary, the present invention provides a modular headset operable to support both voice communications and voice activated commands. This may involve the use of multiple voice CODECs to process voice communications and voice activated commands. The modular headset includes both a microphone and wireless earpiece. The earpiece may further include an interface, a processing circuit, a speaker, a user interface, a pairing circuit, and a registration circuit. The interface allows the earpiece to communicate with the base unit that couples the modular headset to a servicing network. One or more analog to digital converters (ADCs), which may be located within either the microphone or earpiece, are operable to process the transduced voice communications in accordance with either a voice CODEC and/or voice recognition CODEC depending on the selected mode of operation or the processing architecture.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a modular communication device, modular wireless multimedia device, and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. A modular wireless headset operable to support voice communications over at least one servicing network, the modular wireless headset comprising:
   transceiver circuitry operable to receive and transmit Radio Frequency (RF) signals;
   signal conversion circuitry coupled to the transceiver circuitry operable to convert incoming RF signals to incoming audio signals and to convert outgoing audio signals to outgoing RF signals;
   a speaker coupled to the signal conversion circuitry that is operable to render the incoming audio signals audible;
   a microphone coupled to the signal conversion circuitry that is operable to produce the outgoing audio signals;
   voice recognition circuitry coupled to at least the signal conversion circuitry and operable to produce command signals when the modular wireless headset operates in a voice command mode; and
   processing circuitry coupled to at least the voice recognition circuitry and operable to receive and process the command signals.

2. The modular wireless headset of claim 1, wherein the voice command mode is selected to process user voice commands based upon user input.

3. The modular wireless headset of claim 2, further comprising a button coupled to at least the processing circuitry that is operable to receive the user input.

4. The modular wireless headset of claim 3, wherein the command signals initiate call waiting functions.

5. The modular wireless headset of claim 1, further comprising at least one housing that contains the transceiver circuitry, the signal conversion circuitry, the speaker, the microphone, the voice recognition circuitry, and the processing circuitry.

6. The modular wireless headset of claim 1, wherein the command signals initiate at least one function selected from a group consisting of:
   network interface functions;
   base unit interface functions;

directory functions;
caller ID functions;
voice activated commands;
call waiting functions;
call conferencing functions;
call initiation functions; and
device programming functions.

7. The modular headset of claim 1, wherein the user voice commands are operable to validate and/or authenticate a servicing network.

8. A method for servicing voice communications by a wireless headset comprising:
- a Radio Frequency (RF) transceiver receiving inbound RF signals from a base unit, wherein the inbound RF signals contain inbound digital voice communications;
- signal conversion circuitry converting the inbound digital voice communications into inbound analog voice communications;
- a speaker rendering the inbound analog voice communications audible;
- a microphone capturing user voice commands;
- voice recognition circuitry processing the user voice commands to produce digital commands;
- processing circuitry initiating wireless headset commands based on the digital commands;
- the microphone producing outbound analog voice communications;
- the signal conversion circuitry converting the outbound analog voice communications into outbound digital voice communications; and
- the RF transceiver transmitting the outbound digital voice communications to the base unit.

9. The method of claim 8, further comprising the RF transceiver coupling the wireless headset to a servicing network selected from a group consisting of:
- cellular network;
- public switched telephone network (PSTN);
- wide area network (WAN);
- local area network (LAN); and
- a wireless local area network (WLAN).

10. The method of claim 8, further comprising the RF transceiver switching servicing networks while servicing a voice communication.

11. The method of claim 8, wherein the wireless headset commands comprise at least one function selected from a group consisting of:
- network interface functions;
- base unit interface functions;
- directory functions;
- caller ID functions;
- voice activated commands;
- call waiting functions;
- call conferencing functions;
- call initiation functions; and
- device programming functions.

12. The method of claim 8, further comprising a tactile interface initiating a voice command mode based upon user input.

* * * * *